United States Patent [19]

Huellinghorst

[11] 3,890,560

[45] June 17, 1975

[54] SOLID STATE ZERO-SENSING CONTROL

[75] Inventor: Thomas R. Huellinghorst, Florissant, Mo.

[73] Assignee: Unidynamics/St. Louis, Inc., St. Louis, Mo.

[22] Filed: Oct. 24, 1972

[21] Appl. No.: 299,937

[52] U.S. Cl........ 323/22 SC; 307/133; 307/252 UA; 323/24; 323/38

[51] Int. Cl. .......................................... H03k 17/56

[58] Field of Search.................... 323/22 SC, 24, 38; 307/252 P, 252 UA, 252 J, 133

[56] References Cited

UNITED STATES PATENTS

| | | | |
|---|---|---|---|
| 3,372,328 | 3/1968 | Pinckaers | 323/24 X |
| 3,458,800 | 7/1969 | Bross | 307/133 |
| 3,493,783 | 2/1970 | Till | 323/24 |
| 3,493,835 | 2/1970 | Hellmann | 307/133 X |
| 3,708,696 | 1/1973 | Lorenz | 307/252 UA |
| 3,812,382 | 5/1974 | Pascente | 307/252 UA |

*Primary Examiner*—Gerald Goldberg

[57] ABSTRACT

A zero-sensing control which has a signal-sensing SCR, has a resistor connecting the anode of that signal-sensing SCR to the positive terminal of a D.C. source which is connected directly in series with a load and which conducts a control current which flows thru said load and which recurrently increases the control voltage thereof from essentially zero to a peak value and then permits that control voltage to decrease to essentially zero, has a resistor connecting the gate of that signal-sensing SCR to that positive terminal, and has the cathode of that signal-sensing SCR connected to the negative terminal of that D.C. source. The value of the resistor which connects the gate-cathode circuit of the signal-sensing SCR to the positive terminal, and the resistance of that gate-cathode circuit, permit the current which flows through that gate-cathode circuit to reach the firing point of the signal-sensing SCR while the output voltage of the D.C. source is just a small percentage of its peak value. When that signal-sensing SCR becomes conductive, it shunts the gate-cathode circuit of a control SCR and thereby enables a threshold device in that gate-cathode circuit to keep that control SCR non-conductive; but when that signal-sensing SCR remains non-conductive, it causes that threshold device to permit sufficient current to flow through the gate-cathode circuit of that control SCR to render that control SCR conductive. The D.C. source is a diode-type bridge rectifier; and the signal-sensing SCR is connected across the D.C. terminals of that bridge rectifier. The A.C. terminals of that bridge rectifier are connected to a source of A.C., and power SCRs also are connected in series with that load to that source of A.C.; and those power SCRs have resistors connected in parallel with the gate-cathode circuits thereof. It is important to keep the current which flows through the anode-cathode circuit of the signal-sensing SCR from directly affecting the voltages at the gates of the power SCRs therefore, two of the diodes of the bridge rectifier are used to shunt the anode-cathode current of that signal-sensing SCR around the resistors which are connected in parallel with the gate-cathode circuits of the power SCRs.

19 Claims, 4 Drawing Figures

SOLID STATE ZERO-SENSING CONTROL

This invention relates to improvements in solid state controls. More particularly, this invention relates to improvements in zero-sensing solid state controls.

It is, therefore, an object of the present invention to provide an improved zero-sensing solid state control.

Zero-sensing controls are desirable for many reasons; and hence a number of such controls have been proposed. Some of those zero-sensing controls have been objectionable because they have been excessively expensive or insufficiently stable or both. As a result, it would be desirable to provide a zero-sensing control which was stable in operation but low in cost. The present invention provides such a zero-sensing control; and it is, therefore, an object of the present invention to provide a stable but inexpensive zero-sensing control.

The zero-sensing control provided by the present invention connects the anode of a signal-sensing SCR to the positive terminal of a D.C. source which is connected directly in series with the load and which conducts a control current which flows thru said load and, which recurrently increases the control voltage thereof from essentially zero to a peak value and then permits that control voltage to decrease to essentially zero, and connects the cathode of that signal-sensing SCR to the negative terminal of that D.C. source. A resistor connects the gate of that signal-sensing SCR to that positive terminal; and the value of that resistor, and the resistance of the gate-cathode circuit of the signal-sensing SCR, permit the current which flows through that gate-cathode circuit to reach the firing point of the signal-sensing SCR while the output voltage of the D.C. source is just a small percentage of its peak value. As a result, the zero-sensing circuit has a high degree of stability; because even if the value of the resistor were to change substantially, and even if the resistance of that gate-cathode circuit were to change substantially, the current which flows through that gate-cathode circuit would reach the firing point of the signal-sensing SCR each time the control voltage of the D.C. source increased from essentially zero toward its peak value. It is, therefore, an object of the present invention to provide a signal-sensing SCR which has the anode-cathode circuit thereof connected across a D.C. source which recurrently increases the control voltage thereof from essentially zero to a peak value and then permits that control voltage to decrease to essentially zero, which has a resistor connecting the gate-cathode circuit of that signal-sensing SCR to the positive terminal of that D.C. source, and which will become conductive while the control voltage of that D.C. source is just a small percentage of its peak value.

The zero-sensing control provided by the present invention can be used to develop a signal which can be amplified and then used to render one or more power SCRs of a solid state relay conductive. Each power SCR of that solid state relay will have a resistor connected in parallel with its gate-cathode circuit; and that power SCR will become conductive as soon as the value of the current flowing through that resistor attains a predetermined value. If the current flowing through the zero-sensing control were to be permitted to flow through that resistor — as has been done in at least one prior solid state relay which uses SCRs — transient voltages could accidentally render those SCRs conductive. To keep the current, which flows through the signal-sensing SCR, from also flowing through the resistor that parallels the gate-cathode circuit of the power SCR of the solid state relay, the present invention provides a diode path for that current. As a result, the power SCR or SCRs of a solid state relay, in which the zero-sensing control of the present invention is incorporated, will be less susceptable to being rendered conductive by voltage transients. It is, therefore, an object of the present invention to provide a diode path for the current flowing through a zero-sensing control which will keep that current from also flowing through a resistor that parallels the gate-cathode circuit of a power SCR which is part of a solid state relay incorporating that zero-sensing control.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

DESCRIPTION OF THE PREFERRED EMBODIMENTS

Figure 1:
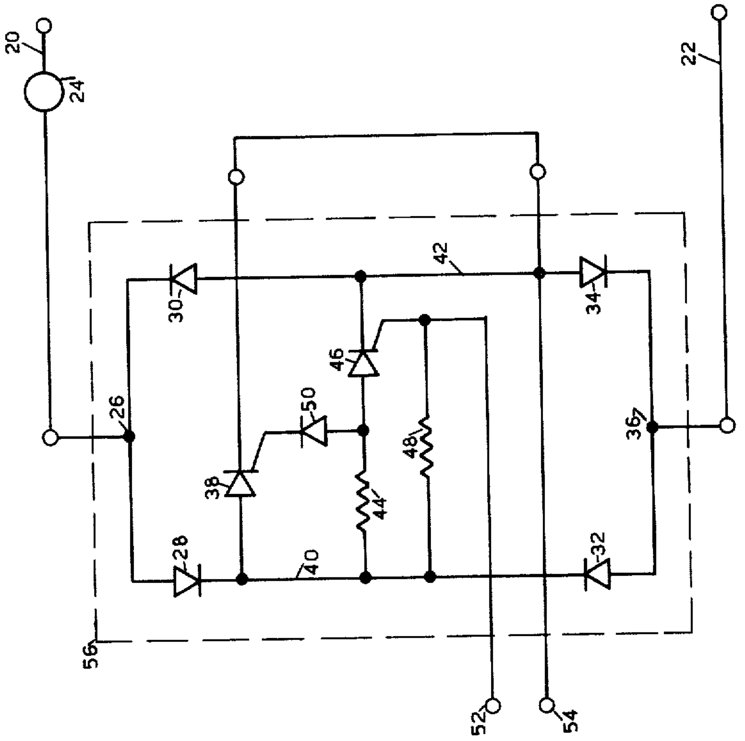
FIG. 1 is a schematic diagram which shows a load and a switching circuit for that load which includes one preferred embodiment of zero-sensing control that is made in accordance with the principles and teachings of the present invention.

Referring particularly to FIG. 1, the numerals 20 and 22 denote conductors which can be connected to a source of A.C.; and, in one preferred embodiment of the present invention, that source of A.C. supplies 60 cycle, single phase, 117 volt A.C. The numeral 26 denotes one of the A.C. terminals of a diode-type bridge rectifier which includes diodes 28, 30, 32 and 34. A load 24 is connected between the conductor 20 and the A.C. terminal 26, but the other A.C. terminal 36 of that diode-type bridge rectifier is directly connected to the conductor 22.

The numeral 38 denotes a control SCR which has the anode thereof connected to a conductor 40 serves as one D.C. terminal of the diode-type bridge rectifier; and that control SCR has the cathode thereof connected to a conductor 42 which serves as the other D.C. terminal of that diode-type bridge rectifier. A resistor 44 connects the anode of a signal-sensing SCR 46 to the conductor 40; and the cathode of that signal-sensing SCR is connected to the conductor 42. A resistor 48 connects the gate of the signal-sensing SCR 46 to the conductor 40; and the value of that resistor will be many times larger than the value of the resistor 44.

A terminal 52 is connected to the gate of the signal-sensing SCR 46 and also to the right-hand end of the resistor 48; and a terminal 54 is connected directly to the conductor 42. The numeral 50 denotes a diode which has the anode thereof connected intermediate the resistor 44 and the anode of the signal-sensing SCR 46, and which has the cathode thereof connected to the gate of the control SCR 38. The diode-type bridge rectifier, the control SCR 38, the signal-sensing SCR 46, the resistors 44 and 48 and the diode 50 constitute a switching circuit which is enclosed within a dashed-line block 56.

The terminals 52 and 54 can be connected to any suitable signal-supplying circuit which normally is "open" but which is selectively "closed" or alternatively is normally nonconducting but is selectively made conducting.

Figure 2:
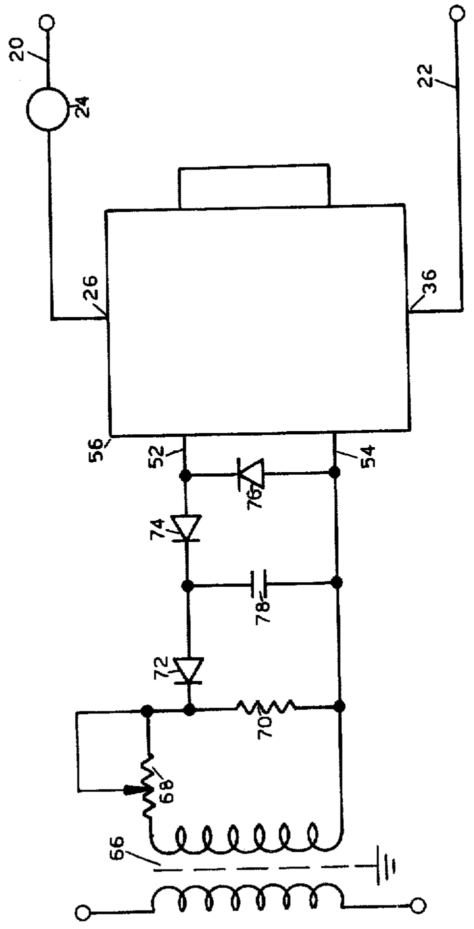
FIG. 2 is a schematic diagram which shows a load, the switching circuit of FIG. 1, and a circuit which supplies a triggering signal to the zero sensing control of that switching circuit, and it shows that switching circuit as a block.

FIG. 2 shows a suitable, singal-supplying circuit. However, it should be understood that virtually every normally-open, selectively-closed signal-supplying circuit could be connected to terminals 52 and 54.

At the beginning of every alternation of the A.C.; the voltage between the conductors 20 and 22 will be essentially zero, and both the control SCR 38 and the signal-sensing SCR 46 will be non-conductive. If the signal-supplying circuit is "open," current will, during any given alternation of the A.C. when conductor 20 is positive relative to conductor 22, flow from conductor 20 via load 24, A.C. terminal 26, diode 28, conductor 40, resistor 48, the gate-cathode circuit of signal-sensing SCR 46, conductor 42, diode 34, and A.C. terminal 36 to the conductor 22. As the voltage across the conductors 20 and 22 increases during that alternation, the value of the current flowing through the gate-cathode circuit of signal-sensing SCR 46 will quickly reach the firing point of that signal-sensing SCR; and, thereupon, current will flow from conductor 20 via load 24, A.C. terminal 26, diode 28, conductor 40, resistor 44, the anode-cathode circuit of signal-sensing SCR 46, conductor 42, diode 34, and A.C. terminal 36 to the conductor 22. The anode-cathode circuit of the signal-sensing SCR 46 is effectively connected in parallel with the series-connected diode 50 and the gate-cathode circuit of control SCR 38; and, as soon as that anode-cathode circuit is rendered conductive during an alternation of the A.C., that anode-cathode circuit will effectively shunt that series-connected diode and gate-cathode circuit. Moreover, once the anode-cathode circuit of that signal-sensing SCR has become conductive during an alternation of the A.C., that anode-cathode circuit will remain conductive throughout the remainder of that alternation — even if the signal-supplying circuit became "closed" during the remainder of that alternation. Consequently, during that alternation of the A.C., the signal-sensing SCR 46 will keep the control SCR 38 non-conductive.

The value of the resistor 44 will be high enough to limit the current which can flow through the signal-sensing SCR 46, and hence through the load 24, to just a few milliamperes. Effectively, therefore, the load 24 will not be energized by the rendering of the signal-sensing SCR 46 conductive during that alternation of the A.C.

At the end of that alternation of the A.C., the voltage between the conductors 20 and 22 will decrease essentially to zero and the current flowing through the current-sensing SCR 46 will fall below the level of the holding current of that signal-sensing SCR. As a result, at the end of that alternation of that A.C., the signal-sensing SCR 46 will again become non-conductive. The control SCR 38 which was left non-conductive during that alternation of the A.C. will, of course, continue to be non-conductive at the end of that alternation of the A.C.

If, during the next alternation of the A.C., the signal-supplying circuit which is connected to the terminals 52 and 54 is still "open," current will flow from conductor 22 via A.C. terminal 36, diode 32, conductor 40, resistor 48, the gate-cathode circuit of signal-sensing SCR 46, conductor 42, diode 30, A.C. terminal 26, and the load 24 to the conductor 20. As the voltage across the conductors 20 and 22 increases during that next alternation of the A.C., the value of the current flowing through the gate-cathode circuit of signal-sensing SCR 46 will quickly reach the firing point of that signal-sensing SCR; and thereupon, current will flow from conductor 22 via A.C. terminal 36, diode 32, conductor 40, resistor 44, the anode-cathode circuit of signal-sensing SCR 46, conductor 42, diode 30, A.C. terminal 26, and the load 24 to the conductor 20. The signal-sensing SCR 46 will effectively shunt the series-connected diode 50 and the gate-cathode circuit of control SCR 38; and, once again, that control SCR will remain non-conductive. Consequently, only limited amounts of current will flow through the signal-sensing SCR 46 and the load 24 during that next alternation of the A.C., and during any succeeding alternations of the A.C. in which the signal-supplying circuit, which is connected to the terminals 52 and 54, remains "open."

If the signal-supplying circuit which is connected to the terminals 52 and 54 "closes" prior to or at the beginning of an alternation of the A.C., that signal-supplying circuit will effectively constitute a low-resistance shunt to the gate-cathode circuit of the signal-sensing SCR 46, and thus will keep that signal-sensing SCR from becoming conductive during that alternation of the A.C. For example, if the signal-supplying circuit connected to the terminals 52 and 54 "closes" prior to or at the beginning of an alternation of the A.C. wherein the conductor 20 is positive relative to conductor 22, current will flow from conductor 20 via load 24, A.C. terminal 26, diode 28, conductor 40, resistor 48, terminal 52, the "closed" signal-supplying circuit, terminal 54, conductor 42, diode 34, and A.C. terminal 36 to the conductor 22; and hence the signal-sensing SCR 46 will remain non-conductive. Current then will flow from conductor 20 via load 24, A.C. terminal 26, diode 28, conductor 40, resistor 44, diode 50, the gate-cathode circuit of control SCR 38, conductor 42, diode 34, and A.C. terminal 36 to the conductor 22; and that flow of current will render the control SCR 38 conductive. Thereupon, current will flow from conductor 20 via load 24, A.C. terminal 26, diode 28, conductor 40, the anode-cathode circuit of control SCR 38, conductor 42, diode 34, and A.C. terminal 36 to the conductor 22; and that current will energize the load 24. As the control SCR 38 becomes conductive it will act as a low-resistance shunt to the series-connected resistor 48 and the gate-cathode circuit of the signal-sensing SCR 46, and also will act as a low-resistance shunt to the series-connected resistor 44 and the anode-cathode circuit of that signal-sensing SCR. Consequently, the signal-sensing SCR 46 could not become conductive during the remainder of that alternation, even if the signal-supplying circuit, which is connected to the terminals 52 and 54, were to change from its closed state to its open state during that remainder.

At the end of that alternation of the A.C., the voltage between the conductors 20 and 22 will again fall essentially to zero, and the current flowing through control SCR 38 will fall below the level of the holding current of that control SCR; and, thereupon, that control SCR will again become non-conductive. The current-sensing SCR 46, which was non-conductive during that alternation of the A.C., will, of course, remain non-conductive at the end of that alternation.

If, at the beginning of the next alternation of the A.C., the signal-supplying circuit connected to the terminals 52 and 54 is still "closed," current will flow from conductor 22 via A.C. terminal 36, diode 32, conductor 40, resistor 48, terminal 52, the still "closed" signal-supplying circuit, terminal 54, conductor 42, diode 30, A.C. terminal 26, and load 24 to the conductor 20; and hence the signal-sensing SCR 46 will remain non-conductive. Current then will flow from conductor 22 via A.C. terminal 36, diode 32, conductor 40, resistor 44, diode 50, the gate-cathode circuit of control SCR 38, conductor 42, diode 30, A.C. terminal 26, and the load 24 to the conductor 20; and that current will render that control SCR conductive. Thereupon, current will flow from conductor 22 via A.C. terminal 36, diode 32, conductor 40, the anode-cathode circuit of control SCR 38, conductor 42, diode 30, A.C. terminal 26, and the load 24 to the conductor 20; and that current will energize the load 24. As the control SCR 38 becomes conductive, it will act as a low-resistance shunt to the series-connected resistor 48 and the gate-cathode circuit of the signal-sensing SCR 46, and also will act as a low-resistance shunt to the series-connected resistor 44 and the anode-cathode circuit of that signal-sensing SCR. Consequently, the signal-sensing SCR 46 could not become conductive during the remainder of that alternation, even if the signal-supplying circuit, which is connected to the terminals 52 and 54, were to change from its closed state to its open state during that remainder.

At the end of that alternation of the A.C., the voltage between the conductors 20 and 22 will again fall essentially to zero; and the current flowing through control SCR 38 will fall below the level of the holding current of that control SCR; and, thereupon, that control SCR will again become non-conductive. The current-sensing SCR 46, which was non-conductive during that alternation of the A.C., will, of course, remain non-conductive at the end of that alternation.

It thus should be apparent that the control SCR 38 and the signal-sensing SCR 46 are both non-conductive at the beginning of each alternation of the A.C., and that both of those SCRs are non-conductive at the end of each alternation of the A.C. Further, it should be apparent that if the signal-supplying circuit, which is connected to the terminals 52 and 54 is "open" prior to or at the beginning of an alternation of the A.C., the signal-sensing SCR 46 will become conductive shortly after the beginning of that alternation, and will thereby keep the control SCR 38 from becoming conductive during that alternation. This means that during any alternation of the A.C. in which the signal-supplying circuit, connected to the terminals 52 and 54, is "open," the load 24 will "see" only a few milliamperes of current and thus will not be energized. Additionally, it should be apparent that if the signal-supplying circuit, which is connected to the terminals 52 and 54, is "closed" at the beginning of an alternation of the A.C., the signal-sensing SCR 46 will remain non-conductive and the control SCR 38 will become conductive, and thus will energize the load 24. Moreover, it should be apparent that once the signal-sensing SCR 46 has been rendered conductive during any alternation of the A.C., that signal-sensing SCR will be insensitive to any changes of state of the signal-supplying circuit during the remainder of that alternation of the A.C. Furthermore, it should be apparent that once the control SCR 38 has been rendered conductive during any alternation of the A.C., that control SCR will make the signal-sensing SCR 46 insensitive to any changes of state of the signal-supplying circuit during the remainder of that alternation of the A.C. All of this means that if the signal-sensing SCR 46 is to be kept non-conductive during any alternation of the A.C. — to enable power to be supplied to the load 24 — that signal-sensing SCR must be kept non-conductive at the beginning of that alternation — and hence that signal-sensing SCR and the resistors 44 and 48 truly constitute a zero-sensing control.

In any alternation of the A.C. in which the signal-sensing SCR 46 is intended to become conductive, that signal-sensing SCR will become conductive as the voltage across the conductors 20 and 22 approaches 4 volts. Similarly, in any alternation of the A.C. in which the control SCR 38 is intended to become conductive, that control SCR will become conductive as the voltage across the conductors 20 and 22 approaches 4 volts. If the value of any component in FIG. 1 were to change substantially, the voltage level at which the signal-sensing SCR 46 or the control SCR 38 became conductive might increase somewhat; but, unless that component were to become inoperable, the signal-sensing SCR 46 or the control SCR 38 would become conductive at some time during each alternation in which it was supposed to become conductive. As a result, the overall circuit of FIG. 1 is more stable and more reliable than are circuits which require charge-storing components such as capacitors. Also, because the zero-sensing control of FIG. 1 includes just the signal-sensing SCR 46 and the resistors 44 and 48, that zero-sensing control is less expensive to make, and has statistically higher reliability, than prior zero-sensing controls.

Referring particularly to FIG. 2, the numeral 56 denotes a block which is identical to the block 56 in FIG. 1; and a load 24 connects a conductor 20 to the A.C. terminal 26 of that block, while a conductor 22 is directly connected to the A.C. terminal 36 of that block. The conductors 20 and 22 will be suitably connected to a source of A.C., such as a single phase, 60 cycle source of A.C.

The numeral 66 denotes a transformer which is equipped with a shield; and the primary winding of that transformer can be incorporated into a circuit which is to have the current therein sensed. The numeral 68 denotes an adjustable resistor which coacts with a resistor 70 to constitute an adjustable voltage divider that is connected across the secondary winding of the transformer 66. Diodes 72 and 74 connect the upper end of the resistor 70 to the terminal 52 of the block 56; and the lower end of the resistor 70 is directly connected to the terminal 54 of that block. A capacitor 78 has the lower terminal thereof connected to the lower end of the resistor 70 and to the terminal 54, and it has the upper terminal thereof connected to the anode of diode 72 and to the cathode of diode 74. A diode 76 has the anode thereof connected to the lower ends of resistor 70 and of capacitor 78 and to terminal 54, and has the cathode thereof connected to the anode of diode 74 and to the terminal 52. The transformer 66, the adjustable resistor 68, the resistor 70, the diodes 72, 74 and 76, and the capacitor 78 constitute a signal-supplying circuit which can be sued to supply signals to the signal-sensing SCR 46 in the block 56.

As shown particularly in FIG. 1, the resistor 48 in the block 56 connects the terminal 52 to the conductor 40 which serves as one of the D.C. terminals of the diode-type bridge rectifier within that block, and the terminal 54 is directly connected to the conductor 42 which serves as the other D.C. terminal of that diode-type bridge rectifier. Diode 74, diode 72, and resistor 70 constitute a path which is in parallel relation to the base-emitter circuit of the signal-sensing SCR 46 in the block 56; and diodes 74 and 72, the left-hand section of adjustable resistor 68, and the secondary winding of transformer 66 constitute another path which is in parallel relation to that base-emitter circuit. However, as long as no current flows through the primary winding of transformer 66, no current will flow through either of those paths; because the signal-sensing SCR 46 of the block 56 will be conductive during each alternation of the A.C. which is applied to the conductors 20 and 22 — and thus will effectively shunt both of those paths. Also, the gate-cathode current of the control SCR 38 of that block will be shunted; and hence the anode-cathode circuit of that control SCR will be non-conductive, and the load 24 will remain deenergized during each alternation of the A.C. That load can be the coil of a relay, can be an indicator, can be a counter, or can be any other suitable electrical component.

When current flows through the primary winding of the transformer 66, current will flow in the secondary winding of that transformer; and, on those alternations of the current when the upper terminal of that secondary winding is negative relative to the lower terminal of that secondary winding, current will flow from that lower terminal via resistor 70 and the left-hand section of adjustable resistor 68 to the upper terminal of that secondary winding. Current also will tend to flow from the lower terminal of that secondary winding via capacitor 78, diode 72, and the left-hand section of the adjustable resistor 68 to the upper terminal; and, in addition, current will tend to flow from the lower terminal of that secondary winding via diode 76, diode 74, diode 72, and the left-hand section of the adjustable resistor 68 to the upper terminal of that secondary winding. This means that during such an alternation, the capacitor 78 will tend to become charged with the upper terminal thereof negative relative to the lower terminal thereof. During the next alternation of the current flowing through the primary winding of the transformer 66, the upper terminal of the secondary winding of that transformer will be positive relative to the lower terminal of that transformer; and hence current will tend to flow from that upper terminal via the left-hand section of adjustable resistor 68 and resistor 70 to the lower terminal of that secondary winding. Current will be unable to flow from the upper terminal of the secondary winding of transformer 66 via the left-hand section of adjustable resistor 68 and the diode 72 and capacitor 78; and similarly, current will be unable to flow from the upper terminal of that secondary winding via the left-hand section of adjustable resistor 68 and diodes 72, 74 and 76. As a result, a uni-directional charge will develop across the capacitor 78 in response to succeeding alternations of the current flowing through the primary winding of the transformer 66; and that uni-directional charge will be opposed to the charge which the diode-type bridge rectifier in the block 56 tends to maintain across the gate-cathode circuit of signal-sensing SCR 46. If the level of the current flowing through the primary winding of the transformer 66 attains a value which enables the secondary winding of the transformer 66 to develop a charge across the capacitor 78 which is great enough to back-bias the gate-cathode circuit of signal-sensing SCR 46, the signal-supplying circuit of FIG. 2 will effectively act as a "closed" circuit; and, during the next alternation of the A.C. applied to the conductors 20 and 22, the signal-sensing SCR 46 in the block 56 will become non-conductive. Thereupon, the gate-cathode circuit of the control SCR 38 will have sufficient current flow through it to render that control SCR conductive, and thereby enable that control SCR to energize the load 24.

This means that as long as the level of current flowing through the primary winding of the transformer 66 is below a predetermined value, the load 24 will remains deenergized. However, when the level of that current reaches a predetermined value, the signal-sensing SCR 46 will be non-conductive during the ensuing alternation of A.C. appplied to the conductors 20 and 22; and the control SCR 38 will become conductive and will energize the load 24. In this way the overall circuit shown in FIG. 2 is able to sense, and to provide an appropriate response to, a predetermined increase in the current which is flowing in the circuit in which the primary winding of the transformer 66 is incorporated.

The diode 76 has the cathode thereof connected to the gate of the signal-sensing SCR 46 by the terminal 52, and it has the anode thereof connected to the cathode of that signal-sensing SCR by the terminal 54 and by the conductor 42. Consequently, that diode will limit the amount of inverse voltage which can be applied to the gate-cathode circuit of that signal-sensing SCR. In doing so, the diode 76 keeps the gate-cathode circuit of the signal-sensing SCR 46 from being injured by the application thereto of an objectionably high inverse voltage.

The adjustable resistor 68 can be adjusted to determine the amount of current which must flow through the primary winding of the transformer 66 before the voltage across the capacitor 78 can rise to the point where it will back-bias the gate-cathode circuit of the signal-sensing SCR 46. As a result, that adjustable resistor makes it possible for the signal-supplying circuit of FIG. 2 to be set to sense and to respond to different levels of current in the circuit of which the primary winding of transformer 66 is a part.

Figure 3:
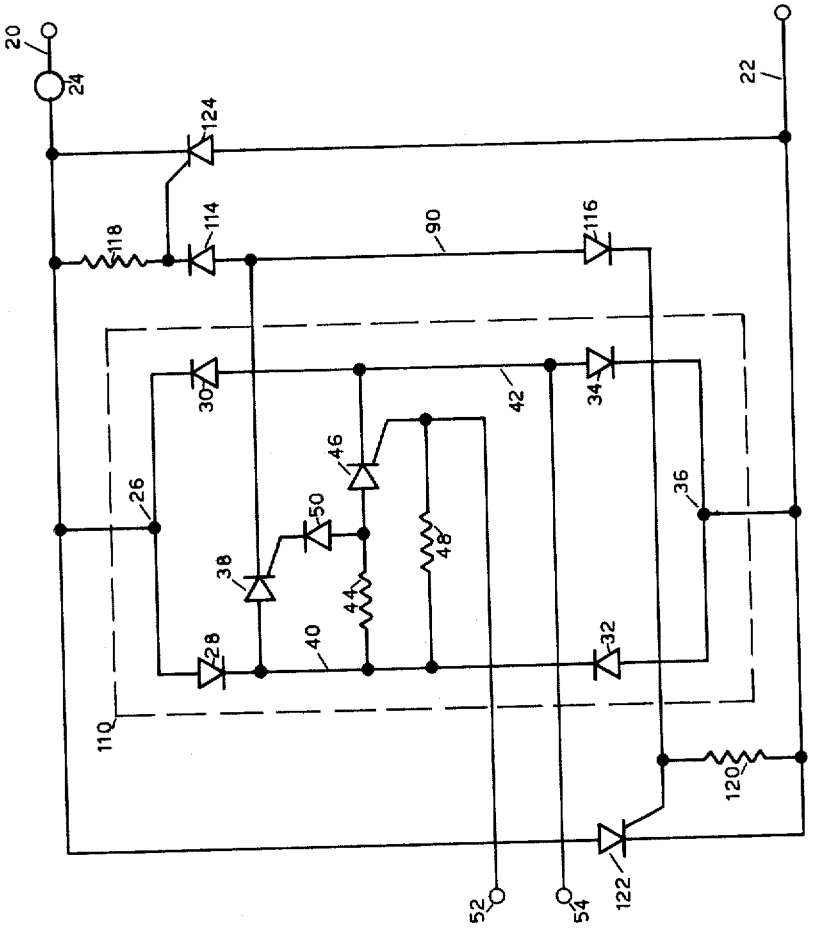
FIG. 3 is a schematic diagram which shows a load and a solid state relay in which the zero-sensing control of FIG. 1 is incorporated.

Referring particularly to FIG. 3, the numerals 20 and 22 denote conductors which are connectable to a suitable source of A.C., such as a source of single phase A.C. The numeral 24 denotes a load which is connected between the conductor 20 and an A.C. terminal 26 of a diode-type bridge rectifier which includes diodes 28, 30, 32 and 34. The numeral 36 denotes the other A.C. terminal of that diode-type bridge rectifier; and that A.C. terminal is connected to the conductor 22. The numeral 40 denotes a conductor which serves as one of the D.C. terminals of the diode-type bridge rectifier; and the numeral 42 denotes a conductor which serves as the other D.C. terminal of that diode-type bridge rectifier.

The numeral 38 denotes a control SCR which has the anode thereof connected to the conductor 40 and which has the cathode thereof connected to a conductor 90 which extends between the anodes of a diode 114 and of a diode 116. The numeral 44 denotes a resistor which is connected in series with the anode-cathode circuit of a signal-sensing SCR 46 between the conductors 40 and 42; and the numeral 48 denotes a resistor which is connected to the gate of that signal-sensing SCR. A diode 50 has the anode thereof connected between the resistor 44 and the anode of the signal-sensing SCR 46; and it has the cathode thereof connected to the gate of the control SCR 38. The numeral 122 denotes a power SCR which has the anode thereof connected to the load 24, and which has the cathode thereof connected to the conductor 22; and the numeral 124 denotes the power SCR which has the anode thereof connected to the conductor 22, and which has the cathode thereof connected to the load 24. A resistor 118 has the upper end thereof connected to the load 24 and has the lower end thereof connected to the cathode of the diode 114; and hence that resistor is connected in parallel with the gate-cathode circuit of the power SCR 124. A resistor 120 has the lower end thereof connected to the conductor 22 and has the upper end thereof connected to the cathode of the diode 116; and hence that resistor is connected in parallel with the gate-cathode circuit of the power SCR 122.

The numeral 110 in FIG. 3 denotes a dashed-line block which is essentially identical to the block 56 of FIG. 1. Specifically, both blocks include a diode-type bridge rectifier which includes diodes 28, 30, 32 and 34, both blocks include a signal-sensing SCR 46 and resistors 44 and 48 therefor, both blocks include a control SCR 38, both blocks include a diode 50, and both blocks have terminals 52 and 54. However, the blocks 56 in FIG. 1 directly responds to the application of a signal to the terminals 52 and 54 to control the flow of current through the load 24, whereas the block 110 in FIG. 3 responds to the application of a signal to the terminals 52 and 54 to control the states of conductivity of the power SCRs 122 and 124.

At the beginning of any alternation of the A.C. across the conductors 20 and 22 in FIG. 3, the voltage between those conductors will be essentially zero; and the control SCR 38, the signal-sensing SCR 46, and the power SCRs 122 and 124 will be non-conductive. If the signal-supplying circuit which is connected to the terminals 52 and 54 is "open," current will, during any alternation of the A.C. when the conductor 20 is positive relative to the conductor 22, flow from conductor 20 via load 24, A.C. terminal 26, diode 28, conductor 40, resistor 48, the gate-cathode circuit of signal-sensing SCR 46, conductor 42, diode 34, and A.C. terminal 36 to the conductor 22. As the voltage across the conductors 20 and 22 increases during that alternation, the value of the current flowing through the gate-cathode circuit of the signal-sensing SCR 46 will quickly reach the firing point of that signal-sensing SCR; and, thereupon, current will flow from conductor 20 via load 24, A.C. terminal 26, diode 28, conductor 40, resistor 44, the anode-cathode circuit of signal-sensing SCR 46, conductor 42, diode 34, and A.C. terminal 36 to the conductor 22. The series-connected anode-cathode circuit of the signal-sensing SCR 46 and diode 34 are effectively connected in parallel with the series-connected diode 50, the gate-cathode circuit of control SCR 38, conductor 90, diode 116, and resistor 120; and, as soon as that anode-cathode circuit is rendered conductive during an alternation of the A.C., that anode-cathode circuit will effectively shunt series-connected diode 50, the gate-cathode circuit of control SCR 38, conductor 90, diode 116 and resistor 120. Moreover, once the anode-cathode circuit of the signal-sensing SCR 46 has become conductive during an alternation of the A.C., that anode-cathode circuit will remain conductive throughout the remainder of that alternation — even if the signal-supplying circuit were to become "closed" during the remainder of that alternation. Consequently, during that alternation of the A.C., the signal-sensing SCR 46 will keep the control SCR 38 non-conductive. Because that control SCR remains non-conductive, only leakage current will be able to flow from conductor 20 via load 24, A.C. terminal 26, diode 28, conductor 40, the anode-cathode current of control SCR 38, conductor 90, diode 116, and resistor 120 to the conductor 22; and the voltage drop across the resistor 120 will be insufficient to cause enough current to flow through the gate-cathode circuit of power SCR 122 to render that pwer SCR conductive. During that alternation of the A.C., the power SCR 124 was back-biased; and hence, during that alternation, the control SCR 38 and both of the power SCRs 122 and 124 remained non-conductive. At the end of that alternation of the A.C., the voltage between the conductors 20 and 22 will decrease essentially to zero; and the current flowing through the current sensing SCR 46 will fall below the level of the holding current of that signal-sensing SCR. Consequently, at the end of that alternation of the A.C., the signal-sensing SCR 46, and the control SCR 38 and the power SCRs 122 and 124, which were left non-conductive during that alternation of the A.C., will continue to be non-conductive.

If, during the next alternation of the A.C., the signal-supplying circuit which is connected to the terminals 52 and 54 is still "open," current will flow from conductor 22 via A.C. terminal 36, diode 32, conductor 40, resistor 48, the gate-cathode circuit of signal-sensing SCR 46, conductor 42, diode 30, A.C. terminal 26, and load 24 to the conductor 20. As the voltage across the conductors 20 and 22 increases during that next alternation of the A.C., the value of the current flowing through the gate-cathode circuit of signal-sensing SCR 46 will quickly reach the firing point of that signal sensing SCR; and, thereupon, current will flow from conductor 22 via A.C. terminal 36, diode 32, conductor 40, resistor 44, the anode-cathode circuit of signal-sensing SCR 46, conductor 42, diode 30, A.C. terminal 26, and load 24 to the conductor 20. The series-connected signal-sensing SCR 46 and diode 30 will then effectively shunt the series-connected diode 50, the gate-cathode circuit of control SCR 38, diode 114 and resistor 118; and, once again, that control SCR will remain non-conductive. Consequently, only leakage current will flow through the control SCR 38 and the load 24 during that next alternation of the A.C., and during any succeeding alternations of the A.C. in which the signal-supplying circuit, which is connected to the terminals 52 and 54, remains "open."

If the signal-supplying circuit which is connected to the terminals 52 and 54 "closes" prior to or at the beginning of an alternation of the A.C., that signal-supplying circuit will effectively constitute a low resistance shunt to the gate-cathode circuit of the signal-sensing SCR 46; and thus will keep that signal-sensing SCR from becoming conductive during that alternation of the A.C., all as explained hereinbefore in connection with FIG. 1. Thereupon, current will flow from conductor 40 via resistor 44, diode 50, the gate-cathode circuit of control SCR 38, and either through diode 114 and resistor 118 and load 24 to the conductor 20 or through diode 116 and resistor 120 to the conductor 22. That flow of current will be great enough to render the control SCR 38 conductive; and current then will flow from conductor 40 via the anode-cathode circuit of that control SCR through diode 114, resistor 118 and load 24 to conductor 20, or through diode 116 and resistor 120 to conductor 22. The amount of current which will then flow through the resistor 118 or through the resistor 120 will be great enough to develop an IR drop across that resistor which will be large enough to cause sufficient current to flow through the gate-cathode circuit of the adjacent power SCR to render that power SCR conductive. Thereafter, during that alternation of the A.C., and during all succeeding alternation of the A.C. wherein the signal-supplying circuit is "closed," one or the other of the power SCRs 122 and 124 will be conductive and will energize the load 24.

The concept of using a zero-sensing control to render back-to-back power SCRs conductive on successive alternations of the A.C. across which those power SCRs are connected is old in the art. However, the overall circuit of FIG. 3 differs from the prior art in providing a zero-sensing control which has as the active elements thereof only the resistors 44 and 48 and the signal-sensing SCR 46, and also in providing the diodes 30 and 34 which effectively bypass the anode-cathode current of that signal-sensing SCR around the resistors 118 and 120. The provision of a zero-sensing control which has just three active elements is important in increasing the reliability while decreasing the cost of that zero-sensing control. The bypassing of the anode-cathode current of the signal-sensing SCR around the resistors 118 and 120 is important because it keeps the cathode-anode current of that signal-sensing SCR from establishing a voltage across either of those resistors, during the appropriate alternation of the A.C., which is independent of the current flow through the control SCR 38. In a circuit which utilizes a zero-sensing control to initiate the supplying of firing current for resistors that are connected in parallel with the gate-cathode circiuts of back-to-back power SCRs, and which does not bypass the current of that zero-sensing control around those resistors, fluctuations in the line voltage and transients can sometimes cause the IR drop across those resistors to reach the values at which the power SCRs will become conductive — even when those power SCRs should not be rendered conductive. All of this means that the circuit of FIG. 3 not only provides an inexpensive and very stable zero-sensing control, but also avoids premature and undesirable firing of the back-to-back power SCRs.

It will be noted that the block 110 of FIG. 3 is identical to the block 56 of FIG. 1, insofar as the elements and the internal wiring thereof are concerned. However, the cathode of the control SCR 38 of FIG. 1 is connected to the conductor 42, which serves as one of the D.C. terminals of the diode-type bridge rectifier, whereas the cathode of the control SCR 38 in FIG. 3 is connected to the conductor 90 which extends between the anodes of the diodes 114 and 116. Because the cathode of the signal-sensing SCR 46 is connected to the conductor 42, whereas the cathode of the control SCR 38 of FIG. 3 is connected to the conductor 90, the anode-cathode current of that signal-sensing SCR is directed into a path which bypasses the resistors 118 and 120. As a result, that anode-cathode current can not coact with a fluctuation in line voltage or with a transient to render either of the power SCRs 122 and 124 conductive.

Where the overall circuit of FIG. 3 is connected to a source of A.C. which supplies 117 volts of A.C., and where the signal-supplying circuit connected to the terminals 52 and 54 is "open," the signal-sensing SCR 46 will become conductive before the voltage across the conductors 20 and 22 reaches 4 volts. This means that even if a substantial change were to occur in the value of resistor 44 or 48 or of the signal-sensing SCR 46, the continually-increasing voltage across the conductors 20 and 22 would be able to render that signal-sensing SCR conductive before the end of the alternation of the A.C. As a result, the zero-sensing control of FIG. 3 is able to render the signal-sensing SCR 46 conductive in any alternation wherein it should be conductive — even if substantial changes were to occur in the values of resistors 44 and 48 or of that signal-sensing SCR. This is in contrast to circuits wherein stored charges are relied upon to render SCRs conductive.

Figure 4:
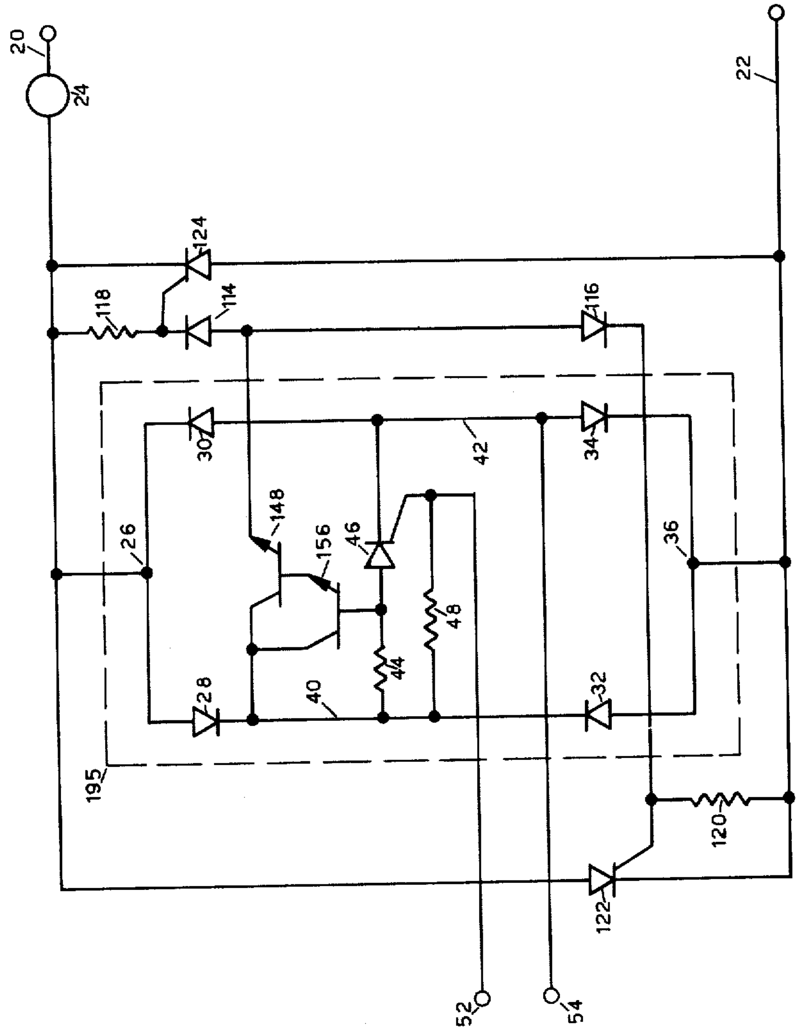
FIG. 4 is a schematic diagram which shows a load and a further solid state relay in which the zero-sensing control of FIG. 1 is incorporated.

FIG. 4 discloses an overall circuit which is very similar to the overall circuit of FIG. 3 — each of those overall circuits having conductors 20 and 22 that are connectable to a source of A.C., a load 24, back-to-back power SCRs 122 and 124, resistors 118 and 120, diodes 114 and 116, and blocks 110 and 195 that include A.C. terminals 26 and 36, diodes 28, 30, 32 and 34, signal-sensing SCRs 46, conductors 40 and 42, and resistors 44 and 48. However, the block 195 in FIG. 4 differs from the block 110 in FIG. 3 in substituting a Darlington amplifier — consisting of NPN transistors 148 and 156 — for the diode 50 and the control SCR 38 of block 110. The Darlington amplifier is used instead of the diode 50 and the control SCR 38, because the overall circuit of FIG. 4 is intended for use with voltages as high as 440 volts; and inexpensive commercial-grade control SCRs, which could stand the heavy service required of the control element in FIG. 4, are not presently available. However, relatively inexpensive commercial-grade transistors are available which can stand such heavy service; and such transistors are used in the Darlington amplifier.

The operation of the overall circuit in FIG. 4 is essentially identical to the operation of the overall circuit in FIG. 3. As long as the signal-supplying circuit which is connected to the terminals 52 and 54 is "open," the signal-sensing SCR 46 in FIG. 4 will become conductive during each alternation of the A.C.; and hence the series-connected anode-cathode circuit of signal-sensing SCR 46 and diode 30 or diode 34 will consitute a low resistance shunt to the series-connected base-emitter circuit of transistor 156, the base-emitter circuit of transistor 148, and either diode 114 and resistor 118 or diode 116 and resistor 120. The shunting of the latter series-connected circuit will effectively keep the collector-emitter circuits of both of the transistors 148 and 156 non-conductive; and hence only leakage current will be able to flow through the collector-emitter circuit of transistor 148, and then either through diode 114 and resistor 118 or through diode 116 and resistor 120. The IR drop across either of those resistors will be too small to enable sufficient current to flow through the gate-cathode circuit of the adjacent power SCR to render that power SCR conductive; and hence both of the power SCRs 122 and 124 will remain non-conductive.

However, where the signal-supplying circuit is "closed" prior to or at the beginning of an alternation of the A.C., the signal-sensing SCR 46 in FIG. 4 will remain non-conductive; and hence sufficient current will flow through the series-connected base-emitter circuit of transistor 156, the base-emitter circuit of transistor 148, and then either through diode 114 and resistor 118 or through diode 116 and resistor 120 to render the transistors 156 and 148 fully conductive. Thereafter, a substantial level of current will flow through the collector-emitter circuit of transistor 148 and then through diode 114 and resistor 118 or through diode 116 and resistor 120; and that level of current will be high enough to cause the current flowing through the gate-cathode circuit of the appropriate power SCR to render that power SCR conductive.

As the power SCR 122 of the power 124 is rendered conductive, that power SCR will constitute a low-resistance shunt around the series-connected signal-sensing SCR 46 and diode 30 or diode 34. This means that once either of the power SCRs has been rendered conductive during any given alternation of the A.C., the subsequent "opening" of the signal-supplying circuit during the alternation will be unable to render the signal-sensing SCR 46 conductive.

Where the overall circuit of FIG. 4 is connected to a source of A.C., which supplies 440 volts of A.C., and where the signal-supplying circuit connected to the terminals 52 and 54 is "open," the signal-sensing SCR 46 will become conductive before the voltage across the conductors 20 and 22 reaches 6 volts. This means that even if a substantial change were to occur in the value of resistor 44 or 48 or of the signal-sensing SCR 46, the continually-increasing voltage across the conductors 20 and 22 would be able to render that signal-sensing SCR conductive before the end of the alternation of the A.C. As a result, the zero-sensing control of FIG. 4 is able to render the signal-sensing SCR 46 conductive in any alternation wherein it should be conductive — even if substantial changes were to occur in the values of resistors 44 and 48 or of that signal-sensing SCR. This is in contrast to circuits wherein stored charges are relied upon to render SCRs conductive.

In each of the circuits shown by FIGS. 1, 2, 3 and 4, the determination of whether or not the signal-sensing SCR 46 is to be rendered conductive or is to be permitted to remain non-conductive during any alternation of the A.C. occurs while the voltage across the A.C. is essentially zero. This is desirable, because it reduces the stress to which the overall circuit is subjected, and it minimizes the electromagnetic radiations which that overall circuit will develop. As a result, each of those overall circuits includes a true zero-sensing control. Further, in each of the circuits shown by FIGS. 1, 2, 3, and 4, the various SCRs are selectively rendered conductive without any need of an oscillator or other capacitor-containing firing circuit. As a result, the circuits shown by FIGS. 1, 2, 3 and 4 are unusually stable and reliable circuits.

Where the load 24 in any of the circuits of FIGS. 1, 2, 3, 4 is wholly resistive in nature, it will not usually be necessary to connect a filter between the conductor 22 and the left-hand terminal of that load. However, in those instances where the load 24 is highly inductive, it will usually be desirable to connect a filter between the conductor 22 and the left-hand terminal of that load. That filter can be of any suitable design and construction, but a series-connected resistor and capacitor will usually be able to provide the required filtering.

FIGS. 1, 2, 3 and 4 show circuits which selectively permit energization or de-energization of loads that are connected across a source of single phase A.C., but those circuits are not limited to use with loads that are connected across single phase A.C. circuits. For example, for application in a three phase A.C. circuit in the range of 440 volts, the circuit of FIG. 4 could be modified by eliminating the load 24 so that the conductor 20 directly extended to the cathode of the power SCR 124; and then that conductor and the conductor 22 could be connected in series with one phase of the three phase A.C. A duplicate modified circuit of FIG. 4 could be connected in series with the second phase of the three phase A.C., and a third duplicate modified circuit of FIG. 4 could be connected in series with the third phase of that three phase A.C. Suitable signal-supplying circuits for the three modified circuits of FIG. 4 would be provided; and those signal-supplying circuits could be connected so they were all simultaneously "open" or "closed."

If desired, a three-phase load could be controlled by connecting just two of the modified circuits of FIG. 4 in series with just two of the phases of the three-phase A.C. supply. It thus should be apparent that the present invention provides an extremely versatile and useful circuit concept. Not only does that circuit concept make it possible to control large amounts of power with small amounts of control power, but it does so in an exceedingly stable manner. Furthermore, the control of the present invention has a minimum of components, and thus is inexpensive. In addition, the present invention provides a true zero-sensing control; and thus minimizes the severity of the duty to which the overall circuit of which that control is a part is exposed, and also minimizes the amount of electromagnetic radiation which will be developed by that circuit. Further, where power SCRs are used, the present invention bypasses the resistors across the gate-cathode circuits of those power SCRs, and thereby avoids premature and undesirable firing of those SCRs — which could occur if the sum of the control current plus the line voltage fluctuation or the sum of the control current plus the line voltage fluctuation or the sum of the control current plus a transient exceeded the "firing" IR drops across those resistors.

Whereas the drawing and accompanying description have described several preferred embodiments of the present invention it should be apparent to those skilled in the art that various changes may be made in the form of the invention without affecting the scope thereof.

What I claim is:

1. A zero-sensing control which is very stable and which comprises a Zero-Crossing signal-sensing SCR, means connecting the anode of said signal-sensing SCR to the positive terminal of a D.C. source which is connected directly in series with a load and conducts a control current which flows thru said load and which recurrently increases the control voltage thereof from essentially zero to a peak value and then permits that control voltage to decrease to essentially zero, second means connecting the cathode of said signal-sensing SCR to the negative terminal of said D.C. source, one of said means including a resistor, (and) a further resistor connected between said positive terminal of said D.C. source and the gate of said signal-sensing SCR, and control SCR, third means connecting the gate-cathode circuit of said control SCR in parallel relation with the anode-cathode circuit of said signal-sensing SCR, whereby said signal-sensing SCR will effectively shunt said gate-cathode circuit of said control SCR and thereby keep said control SCR from becoming conductive whenever said signal-sensing SCR becomes conductive, and a threshold device in said third means, said threshold device being non-conductive whenever said anode-cathode circuit of said signal-sensing SCR is conductive and thereby preventing the flow of "firing" current through said gate-cathode circuit of said control SCR, said threshold device being conductive whenever said anode-cathode circuit of said signal-sensing SCR is non-conductive and thereby permitting the flow of "firing" current through said gate-cathode circuit of said control SCR.

2. A zero-sensing control as claimed in claim 1 wherein a signal-supplying circuit is connected to said gate and said cathode of said signal-sensing SCR, and wherein said signal-sensing SCR will be rendered conductive as said output voltage starts increasing from essentially zero whenever said signal-supplying circuit is applying an appropriate signal to said gate and said cathode of said signal-sensing SCR.

3. A zero-sensing control as claimed in claim 1 wherein said threshold device acts, whenever said signal sensing SCR remains non-conductive, to permit a voltage to appear between the gate and cathode of said control SCR which is essentially equal to the voltage between the anode and cathode of said signal sensing SCR less the voltage drop across said threshold device.

4. A zero-sensing control as claimed in claim 1 wherein said D.C. source is the D.C. terminals of a diode-type bridge rectifier which is connected in series with a load and a source of A.C.

5. A zero-sensing control as claimed in claim 1 wherein a signal-supplying circuit is connected to said gate and said cathode of said signal-sensing SCR, wherein said signal-sensing SCR will be rendered conductive as said output voltage starts increasing from essentially zero whenever said signal-supplying circuit is applying an appropriate signal to said gate and said cathode of said signal-sensing SCR, and wherein said signal-supplying circuit is either "open" or "closed."

6. A zero-sensing control as claimed in claim 1 wherein a signal-supplying circuit is connected to said gate and said cathode of said signal-sensing SCR, wherein said signal-sensing SCR will be rendered conductive as said output voltage starts increasing from essentially zero whenever said signal-supplying circuit is applying an appropriate signal to said gate and said cathode of said signal-sensing SCR, wherein said signal-supplying circuit includes a selectively conductive and non-conductive element, and wherein said signal-supplying circuit also inclides means to selectively render said element conductive or non-conductive.

7. A zero-sensing control as claimed in claim 1 wherein a signal-supplying circuit is connected to said gate and said cathode of said signal-sensing SCR, wherein said signal-sensing SCR will be rendered conductive as said output voltage starts increasing from essentially zero whenever said signal-supplying circuit is applying an appropriate signal to said gate and said cathode of said signal-sensing SCR, and wherein said signal-supplying circuit isolates said signal-sensing SCR from the input of said signal-supplying circuit.

8. A circuit that is connectable in series with a load to a source of A.C. and that is responsive to a control signal and that comprises at least one SCR having an anode thereof connected to one terminal of said load and having a cathode thereof connected to one terminal of said source of A.C., a resistor that is connected betw en the gate of said SCR and said terminal of said source of A.C. and thus is connected in parallel with the gate-cathode circuit of said SCR, a control means connected between said terminal of said load and said terminal of said source of A.C. and, thus, is connected in series with said load and is further connected to the junction of said SCR gate and said resistor without the use of an isolation device, said control means having a zero-crossing signal-sensing means which is selectively renderable nonconductive and conductive to permit and prevent current to flow through said control means and thus through said resistor, and a signal-supplying circuit which can selectively supply a signal to said zero-crossing signal-sensing means, said zero-crossing signal-sensing means being connected between said terminal of said source of A.C. and said terminal of said load by a path which does not include said resistor, whereby current flowing through said zero-crossing signal-sensing means can not directly affect the voltage developed across said resistor, said control means thus having two separate and distinct paths for current flow, which paths automatically separate the SCR control-current from the zero-crossing signal sensing current thereby preventing the flow of zero-crossing signal-sensing current through said resistor and said SCR gate circuit when said control means is selectively rendered nonconductive and conductive to prevent and permit the flow of sufficient SCR control current through said resistor to prevent and permit conduction of load current by said SCR, said control means is further composed so as to utilize no current limiting resistor in series with said SCR gate to cathode circuit.

9. A circuit as claimed in claim 8 wherein said circuit includes a second SCR having an anode thereof connected to said terminal of said source of A.C. and having a cathode thereof connected to said terminal of said load and includes a second resistor that is connected between the gate of said second SCR and said terminal of said load and thus is connected in parallel with the gate-cathode circuit of said second SCR, wherein said control means also is connected between said terminal of said load of said terminal of said source of A.C. and thus is connected in series with said load and is further connected to the junction of said second SCR gate and said resistor without the use of an isolation device.

10. A circuit as claimed in claim 8 wherein said signal-sensing means includes an SCR which conducts a current that flows thru the load and which can be rendered nonconductive only at the approximate zero crossing of alternations of the A.C. from said source of A.C. and thru which only the zero-crossing signal-sensing current flows.

11. A circuit as claimed in claim 8 wherein said control-means includes a selectively conductive and nonconductive element which can be rendered conductive only at the approximate zero crossing of alternations of the A.C. from said source of A.C. and thru which the control-current must flow to reach the gate of said SCR whereby said SCR can be rendered conductive only at the approximate zero crossing of the A.C. from said source of A.C.

12. A circuit as claimed in claim 8 wherein said resistor is substantially the only resistive element in series relation with said control means.

13. A circuit as claimed in claim 8 wherein current flow separation means includes one or more diode bridge circuits or portions thereof.

14. A circuit as claimed in claim 8 wherein said control means contains no resistive element to limit the flow of thyristor gate control current.

15. A circuit as claimed in claim 8 wherein the components are exclusively semiconductors and resistors.

16. A circuit as claimed in claim 8 wherein only four terminals (i.e. two input and two output) are required.

17. A circuit as claimed in claim 8 wherein said element is at least one transistor.

18. A circuit as claimed in claim 11 wherein said element is an SCR.

19. A circuit as claimed in claim 1 wherein said signal-sensing means includes an SCR which conducts a current that flows thru the load and which can be rendered nonconductive only at the approximate zero crossing of alternations of the A.C. from said source of A.C. and thru which only the zero-crossing signal sensing current flows.

* * * * *